Nov. 7, 1950  E. P. PALMATIER  2,529,102
DEICING SYSTEM FOR AIRCRAFT PROPELLERS
Filed June 22, 1945  3 Sheets-Sheet 1

Inventor
Everett P. Palmatier
Attorney

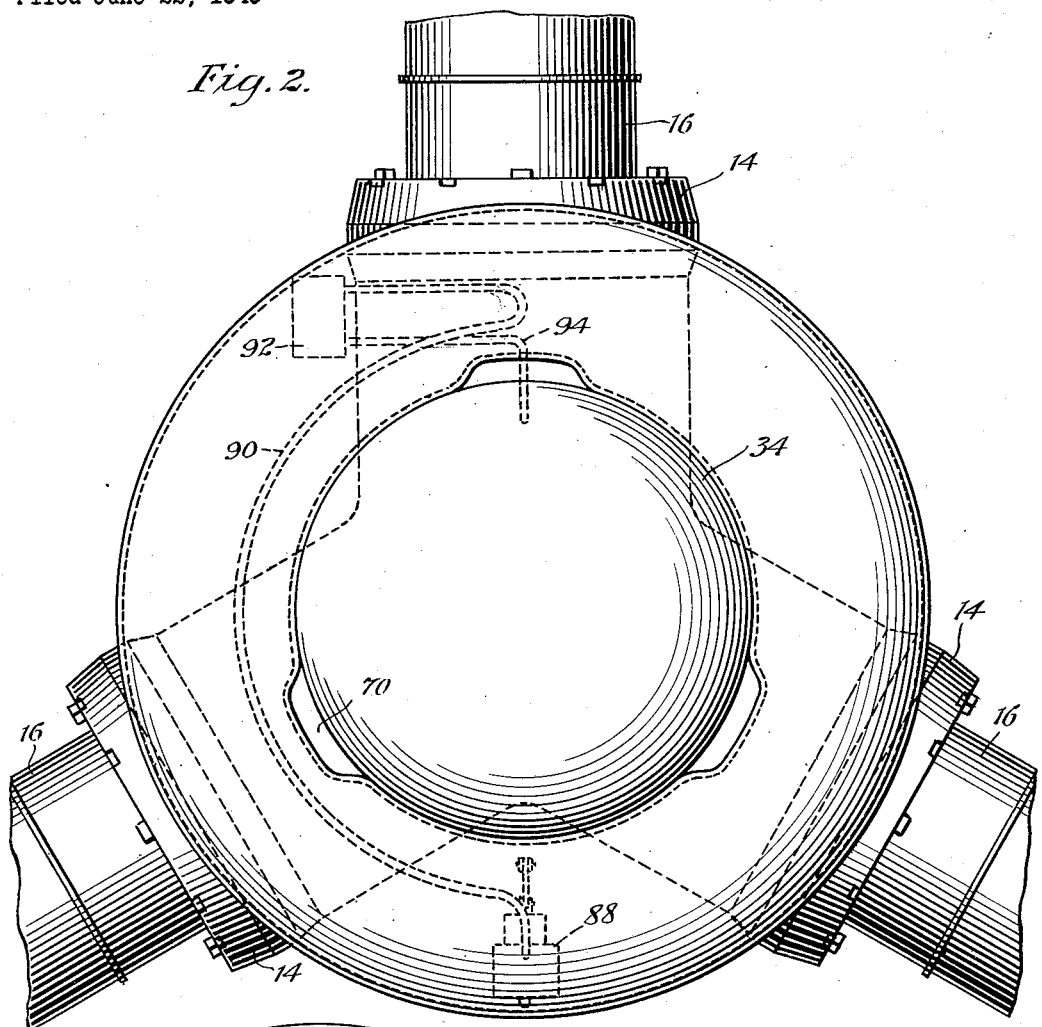
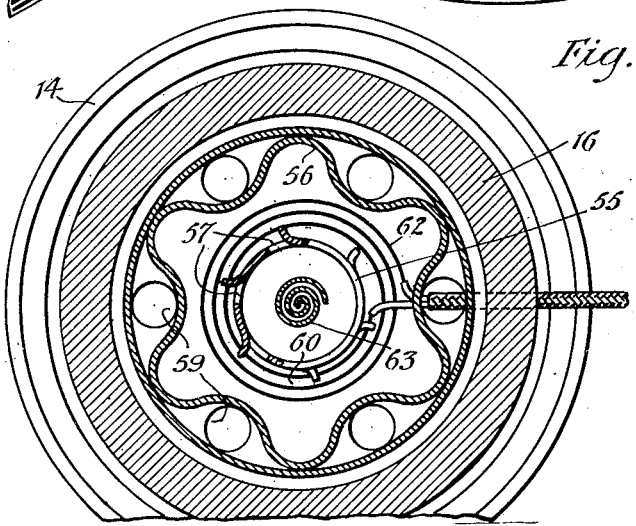
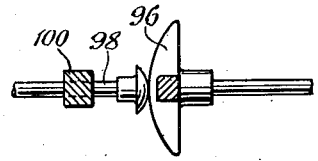

Nov. 7, 1950 E. P. PALMATIER 2,529,102
DEICING SYSTEM FOR AIRCRAFT PROPELLERS
Filed June 22, 1945 3 Sheets-Sheet 3

Inventor
Everett P. Palmatier
Attorney

Patented Nov. 7, 1950

2,529,102

UNITED STATES PATENT OFFICE 2,529,102

DEICING SYSTEM FOR AIRCRAFT PROPELLERS

Everett P. Palmatier, Solvay, N. Y., assignor to Curtiss-Wright Corporation, a corporation of Delaware Application June 22, 1945, Serial No. 600,937

4 Claims. (Cl. 244—134)

This invention relates to de-icing of aircraft propellers and more particularly to an arrangement providing for the burning of fuel within or adjacent the root end of a hollow bladed propeller and employing the products of combustion to heat the blade internally for this purpose.

The formation of ice upon propeller blades with its detrimental effect upon the airfoil shape reduces propeller efficiency as well as adds a load in the form of ice to the blade which may cause loss of balance. It has heretofore been proposed to solve this difficulty by means such as flexible overshoes, transmission of hot gases through the propeller blade, the application of ice non-adhering substances to the blade and the like. Many of these require transmission of fluids from the fuselage to the rotating hub and introduce complicated structures, which are ineffective because of the limitations imposed.

It is an object of the present invention to provide in an aircraft propeller of the hollow blade type a fuel burning means for heating the blade for the thermal de-icing thereof, which means including fuel supply may be substantially entirely carried by the rotating blade and hub, or receive its fuel from the aircraft fuel supply.

Another object of the invention is to provide in a hollow bladed propeller a means for burning fuel and for leading the products of combustion through the hollow of the blade for thermally preventing the formation of ice thereon.

A further object of the invention is to provide in a hollow bladed variable pitch propeller, a relatively simple effective and light weight means for burning fuel within the blade to warm the blade throughout to prevent the formation of ice thereon.

The above and other novel features of the invention will appear more fully hereinafter from the following detailed description when taken in conjunction with the accompanying drawings. It is expressly understood however that the drawings are for illustration purposes only and are not designed as a definition of the limits of the invention, reference being had for this purpose to the appended claims.

In the drawings, wherein similar reference characters indicate like parts,

Fig. 2 is a front end view of the propeller and hub assembly;

Fig. 3 is a transverse section taken through the blade and the burner substantially on the line 3—3 of Fig. 1;

Fig. 4 is an enlarged detail of a fuel pump operating cam shown partly in section and taken substantially on the line 4—4 of Fig. 1;

Figure 1:
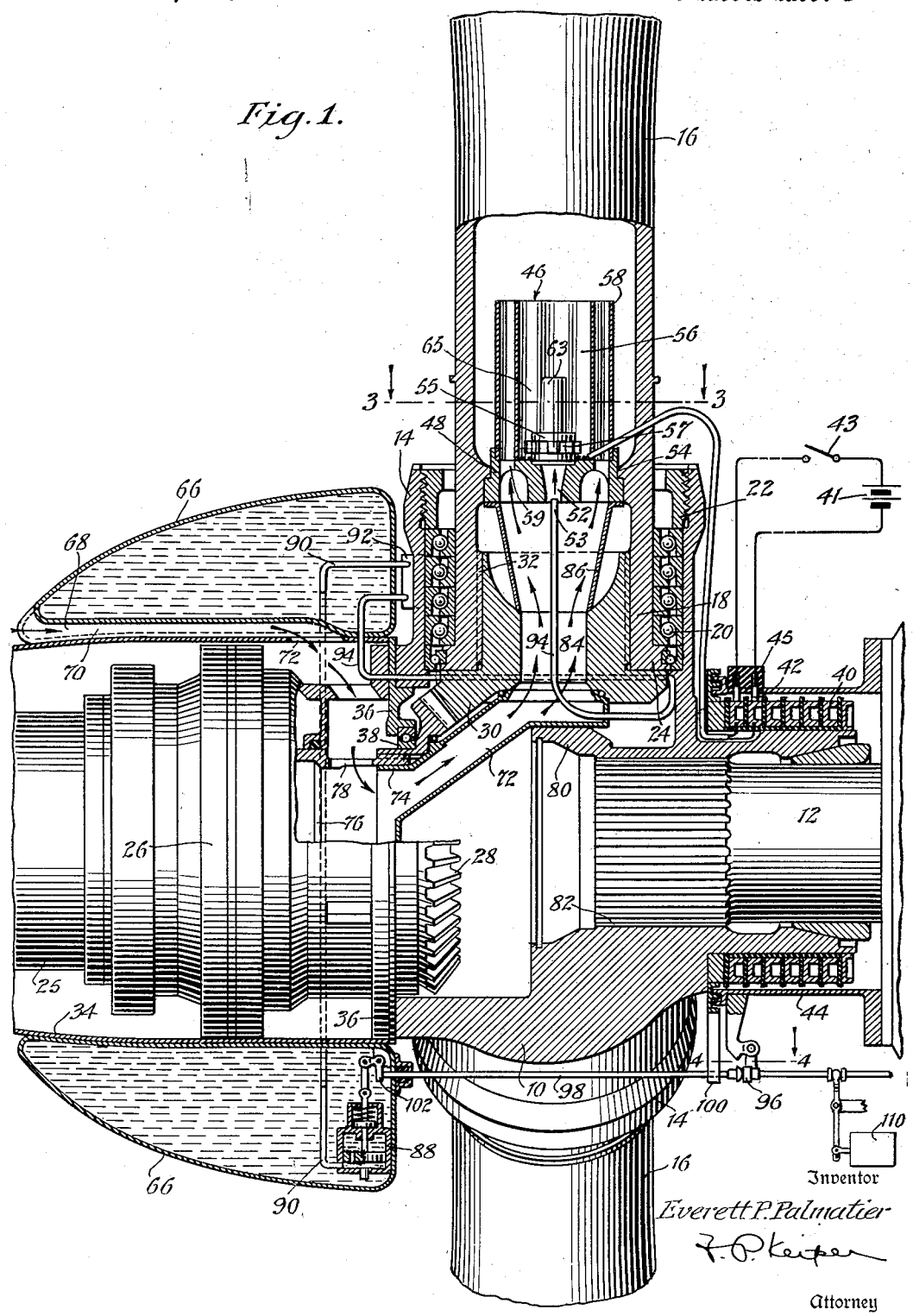
Figure 1 is a sectional view of a propeller hub and blade taken on a plane passing through the hub axis and the axis of a blade carried by the hub.

Referring to Fig. 1, there will be seen illustrated a hub assembly with blades of the variable pitch type. The hub proper 10, is adapted to be secured to the end of a drive shaft 12 and has formed therein two or more radial propeller blade receiving sockets such as 14. In each of the sockets there is positioned a propeller blade 16 having a hollow shank 18, the shank being retained within the socket 14 by suitable anti-friction retaining means such as is generally indicated by the bearings 20 and cooperating retaining shoulders 22 and 24 on the socket and shank, respectively. Pitch varying mechanism comprising a pitch changing motor 25, reduction gear 26 and driving bevel gear 28 acting upon a sector indexing gear 30 splined to the shank 18 of each of the blades 16 as indicated at 32 are mounted on the outboard end of the hub 10. The pitch changing motor 25 and reduction gear 26 are contained within a forward housing 34 secured to the hub through the forward hub annular end adapter plate 36 in which the driving bevel gear is journaled through an anti-friction bearing 38. On the rear end of the hub are positioned a plurality of slip rings 40 to which connection is made by stationary brushes such as 42 carried by a stationary housing sleeve 44 arranged around the rear end of the hub and the drive shaft 12. Through the slip rings, electrical control over the pitch changing motor 25 as well as the functioning of the de-icing mechanism hereinafter to be described is effected.

In order to supply heat internally of the shank 18 of each of the blades, which heat by conduction through the metal of the blade may warm the outer blade surface sufficiently to loosen ice therefrom and prevent initial formation, there is mounted in the hollow shank a fuel burner generally indicated at 46. The burner comprises a disk 48 having an air venturi passage 52 located centrally thereof.

Positioned in the center of the venturi is a nozzle 53 supported from the socket and adapted to atomize liquid fuel and mix the same in the air stream to form a combustible mixture. An igniter button 55 having radial passages 57 for the combustible mixture is arranged adjacent the mouth of the venturi 52 in conjunction with an adjacent igniter 60 having a hot wire ignition coil 62. The disk also carries a loose spirally wrapped sleeve 63 extending into the center of the combustion chamber 65, the sleeve being adapted to stabilize combustion within the chamber upon the sleeve becoming heated during operation. The sleeve thus provides continuous ignition in the event combustion normally should fail, without requiring the continuous operation of the hot-wire igniter normally employed during the initial ignition period only. Current is supplied to the ignition coil through two of the slip rings 40 by a battery 41 and switch 43 connected to the rings through stationary brushes 45.

The disk 48 is retained in place against an annular shoulder 54 within the shank of the blade and the combustion chamber 65 is surrounded by an inner corrugated sleeve 56 and an outer sleeve 58, each being supported upon the disk 48 and arranged coaxially about the central venturi 52. The sleeves are adapted to protect the blade shank from being overheated by direct radiation from the burner, and the passages formed by the corrugated sleeve 56 and the sleeve 58 are aligned with apertures 59 in the disk 48 to admit diluting and cooling air to assist in maintaining an even degree of heat through the length of the blade.

In order to supply the burner with fuel, an annular liquid storage tank is arranged around the pitch-changing motor housing 34 and the shape of the outer wall 66 of the tank is such as to cooperate with the motor housing in providing a fairing or supporting a fairing (not shown) having low aerodynamic head resistance.

To permit the entrance of air for combustion purposes into each of the propeller blades the inner wall of the tank is axially channelled as at 68 at one or more points around the hub in order to provide, in cooperation with the cylindrical pitch-changing motor housing 34, suitable air channels 70. The motor housing is apertured as at 72 to cooperate with the channel 70 and permit the flow of air into the center of the hub whence the flow is directed into the base of each of the hollow propeller blade shanks by means of the ducts 72 formed in a distributing spider 74 coaxially arranged within the pitch-changing drive gear 28. The distributing spider is directly supported from a sleeve portion 80 of the hub, adjacent to the splined connection 82 between the hub and the drive shaft 12. A sleeve 76 adapted to transmit pitch-changing torque from the reducing gear 26 to the pitch-changing drive gear 28 is provided with a plurality of ports 78 through which the air may pass from te channels 70 into the ducts 72 of the distributing spider 74. The spider ducts 72 discharge into the base of the shank 18 of each blade through the shank base aperture 84 and air is thereafter led to the burner disk 48 through a diverging sleeve 86.

The gases formed by combustion in the chamber 65 travel outwardly of the blade after mixing with air supplied through passages 59 to discharge ports preferably arranged along or adjacent to the trailing edge of the blade near the tip. The discharge ports may be so arranged as to cause proper distribution of the hot gases within the hollow blade so that all parts are sufficiently heated to prevent the adherence of ice thereto.

To supply fuel to the burner from the fuel reservoir 66, a displacement pump 88 is provided, the same being illustrated as positioned within the reservoir 66, although any convenient location may be selected. The pump as illustrated is adapted to receive fuel from a point within the reservoir toward the outer position thereof. Suitable connections 90 for conveying the fuel from the pump to a fuel air ratio control device 92 and thence to the burners through conduits 94 passing around and up into the shank of each blade and extending into the venturi 52, are provided. The fuel air ratio control comprises a metering valve controlled in response to atmospheric pressure and rotation speed for the purpose of assuring a combustible ratio of fuel and air which ratio, it will be understood, would otherwise vary with rotational speed of the propeller, and atmospheric pressure, both of which control the quantity of air delivered to the burner.

Actuation of the pump 88 may be effected through the medium of a manually controlled cam non-rotatably supported upon the sleeve housing 44 arranged about the drive shaft 12. For this purpose, there is shown in Fig. 4, a cam 96 adapted to be moved axially by any suitable manual or automatic control means into the path of a cam follower 98 carried by the propeller hub in a suitable bracket 100. The follower is adapted, through a linkage 102 to actuate the pump 88 against the effect of a return spring 104 located within the pump. Upon each rotation of the propeller blade the plunger is displaced an amount corresponding to the position of cam 96, thus enabling the pump displacement to be controlled and varied by the positioning of the cam to deliver a proper quantity of fuel for combustion with the air admitted into each blade. A calibrated automatic atmospheric pressure and rotational speed responsive device as broadly indicated at 110, or manual control may be employed for this purpose as desired. Such control may at times render the use of the fuel air ratio control 92 unnecessary.

Figure 5:
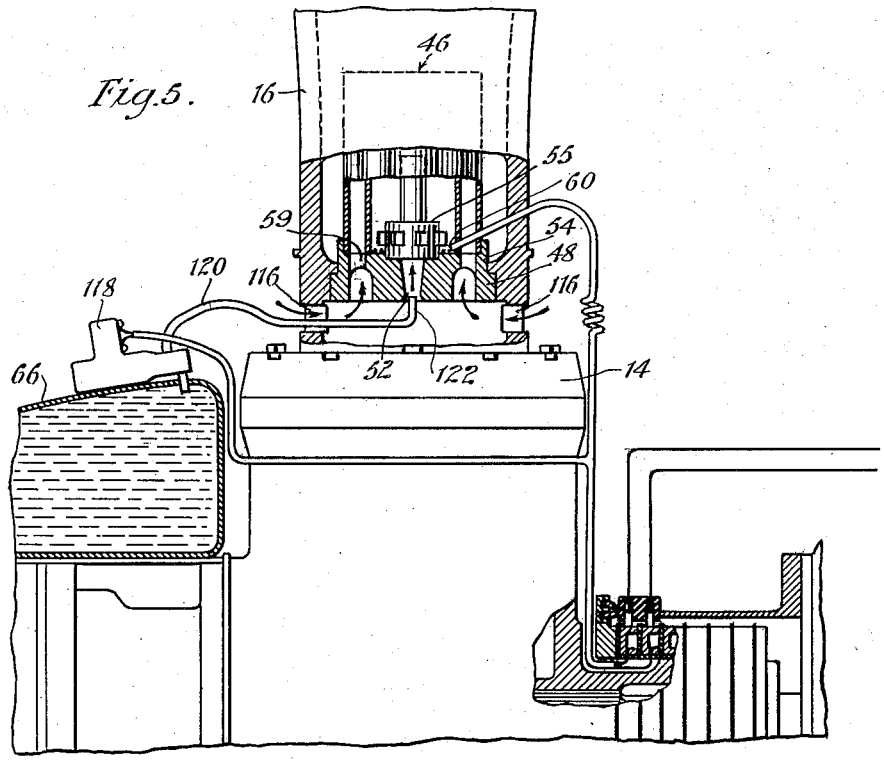
Fig. 5 is a fragmentary side elevation of a modification of the invention, portions thereof being shown in section on a plane passing through the hub axis and the axis of one blade.
Figure 6:
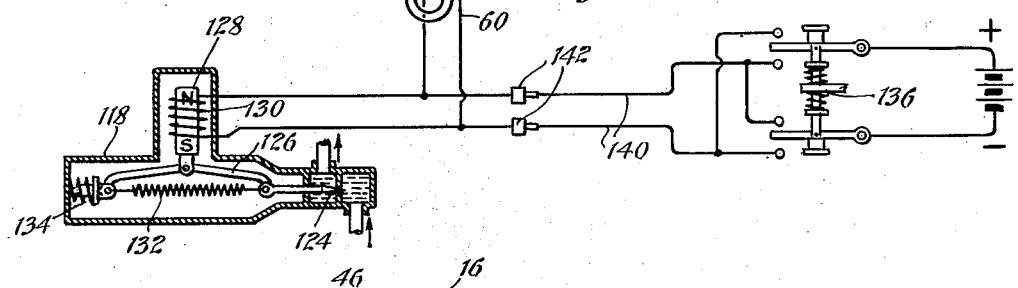
Fig. 6 is a control circuit wiring diagram for controlling the operation of the modified form of Fig. 5.

A modified form of the invention is disclosed in Figs. 5 and 6, wherein the shank of the propeller blade 16 is provided with air admission ports 116 adjacent to the point at which the shank emerges from the hub socket 14. The shank has arranged within and immediately adjacent the ports 116 a burner disk 54 having therein the venturi orifice 52, igniter coil 60 and mixing button 55. The burner disk is also provided with sleeves 56 and 58, the former being corrugated and providing air passages alined with the burner disk apertures 59. Fuel is delivered by centrifugal force from the tank 66 and the control valve 118 mounted thereon, thereby eliminating the necessity for a pump. The fuel line 120 extends through one of the blade ports 116, the port having sufficient arcuate length to permit changes in pitch, and terminates in a jet 122 located in the center of the venturi 52.

Control of the fuel supply and the ignition coil 60 may be effected electrically through a circuit as shown in Fig. 6. Therein, the valve 118 comprises a needle 124 controlling the passage of fuel through the orifice 125, the needle being actuated by a toggle 126, the knee of which carries a polarized core 128 reciprocable within a solenoid 130. Energization of the solenoid with direct current in one direction causes the core to move to the position shown and energization in the reverse direction causes the core to move downwardly (with reference to Fig. 6) tensioning the spring 132 and closing the valve 124 against the reaction of the spring 134 located at the other end of the toggle 126. To energize the solenoid with direct current flowing in one direction or the other, a manual reversing switch 136 may be employed connected to a battery 138. The leads 140 from the switch conduct the current through slip rings 142 to the coil 130 and to simplify the ignition of the burner, the burner coil 60 may be connected in parallel with the leads 140 so that upon opening the valve, the hot wire coil 60 will be heated to an igniting temperature.

Figure 7:
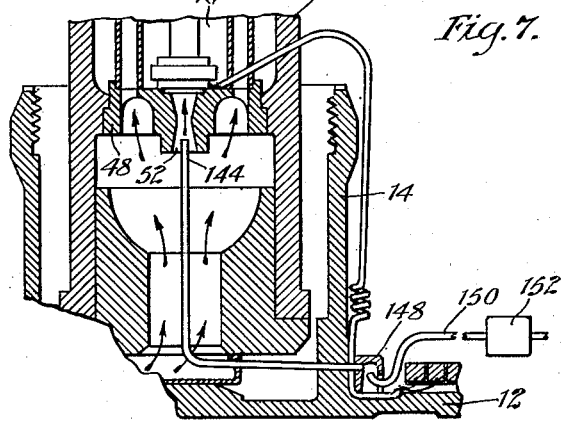
Fig. 7 is a fragmentary side elevation of another modification of the invention shown in section through the hub and blade axes.

In some instances, it may be desirable to obtain the fuel for the burners in each of the propeller blades from the fuel supply of the airplane in which case it becomes necessary to transfer the fuel from the fuselage to the rotating propeller hub. In Fig. 7, there is shown the blade socket 14 carried by the hub 12 with the shank 16 of a propeller blade swiveled therein as in Fig. 1. Fuel is delivered to the venturi 52 from a jet 144 located therewithin which jet is positioned at the end of a conduit 146 leading radially inwardly through the open end of the blade shank to a slinger ring 148 arranged concentrically of the hub 12 immediately to the rear and outside of the blade sockets 14. The slinger ring being rotatable, is adapted to collect fuel supplied thereto radially within from the stationary supply tube 150. Control over the fuel supply to the slinger ring may be effected either manually or by a fuel air ratio control 152 which, for all purposes, may be similar to the fuel air ratio control 92 disclosed in Fig. 1. The jet 144 preferably constitutes a constriction in the conduit 146 such that during rotation of the propeller, a head of liquid will be retained within the tube 146 behind the jet, the height of which depends upon the rate of supply of fuel to the slinger ring 148. By varying the length of the solid column of liquid held back by the jet, the rate of fuel discharge from the jet may be controlled by the pressure head thereon, and be caused to vary in direct proportion to the centrifugal force resulting from propeller rotation.

The operation of the invention in its various forms will readily appear from the foregoing disclosure. With reference to the modification of Fig. 1, to heat the blades in order to prevent the formation of ice thereon or to cause the ice accumulated upon the blades to be loosened therefrom, it is only necessary to supply to the jets, fuel in the proper proportion for burning with the air passing through the orifice 52. Since the ratio of air to fuel as, for example, gasoline, may vary widely and still be ignitable, close control over the ratio while desirable is not essential. Upon commencing the delivery of fuel to the burners, the hot wire ignition coils are heated to an igniting temperature by closing the electric switch 43 and as soon as ignition takes place, the igniting current is cut off. Thereafter, fuel burning within the combustion chamber 65 heats the stabilizing sleeve 63 which thereafter assists in maintaining ignition and combustion even though combustion should momentarily be discontinued for any reason. The air supplied to the orifice 52 and the fuel mixed therewith is in sufficient quantity to support a flame restricted to the combustion chamber 65, it being desirable that the products of combustion leaving the combustion chamber 65 be of a temperature substantially less than that of the flame. The sleeves 56 and 58 surrounding the combustion chamber 65 with the air passages therethrough formed by the corrugations of the sleeve 58 protect the shank of the blade from overheating by direct radiation or otherwise from the flame within the combustion chamber. The orifices in the sleeve also supply a limited amount of air to cool the sleeves and to dilute the products of combustion in order to reduce the temperature thereof from a range as high as 1600 degrees F. to a temperature in the neighborhood of 400 degrees. The combined products of combustion and excess air thereafter travel through the length of the propeller blade delivering heat units to the blade wall prior to exhausting through an exhaust orifice in the trailing edge adjacent the blade tip.

The quantity of heat required to loosen ice from a blade surface is not necessarily great since it will be appreciated, that until the ice adheres and forms a coating upon the blade no serious problem is presented. As soon as the blade or portions thereof become coated with ice, the layer of ice acts as an insulating layer over the area of the coating and because of the superior heat conducting properties of the metal blade, the surface of such coating that is in direct contact with the blade becomes heated and the bond between the ice and the blade is fused and loosened so that centrifugal force thereafter throws the ice free of the blade. By supplying to the blade cavity a quantity of heated gases in a manner to contact the entire inner surface of the hollow blade substantially uniformly, the formation of ice is readily prevented or an ice coating immediately loosened as set forth.

To facilitate the disclosure, various parts such as the pump 88 of Fig. 1, the valve 118 of Fig. 5 and other elements which are subject to the rotation of the propeller, for the sake of simplicity, have not necessarily been illustrated in a manner to compensate for the centrifugal force to which the parts would be subjected. It will be obvious that the various moving parts which are subjected to centrifugal force may be arranged so as to not be affected by such force or may be counter-balanced in any suitable fashion. For example, the piston of the pump 88 may be arranged with its axis of movement tangential to the rotation circle at the end of a radius terminating at the center of gravity of the moving parts. It will be appreciated also that the distribution of fuel to each of the various blades must be uniformly divided so that each blade is supplied with substantially the same quantity as each of the other blades. Where a pump is employed as in Fig. 1, the distribution of fuel therefrom equally to all blades presents no problem. Where a slinger ring such as is disclosed in Fig. 7 is employed, it may be desirable to divide the channel of the slinger ring into an equal number of arcuate sections with each section being connected to a blade. The dividing partition need extend radially inwardly from the base of the channel a slight distance only so as not to interfere with the flow of fluid circumferentially of the ring and such partition may be constituted by but a slight gradual rise in the channel base.

Although several embodiments of the invention have been illustrated and described, it is to be understood that the invention is not limited to any particular form but may be embodied in various combinations of the form shown or in other arrangements which may be made without departing from the spirit of the invention as will be apparent to those skilled in the art. Accordingly, reference will be had to the appended claims for a definition of the limits of the invention.

What is claimed is:

1. In a de-icing mechanism for an aircraft propeller, a hollow hub, a plurality of hollow blades rotatably secured in said hub for pitch variation, an annular pitch-changing gear coaxial with said hub axis, and indexing gears meshing therewith drivably connected with each of said blades, means for delivering air into each of said blades comprising a manifold extending through said annular gear and dividing to supply each blade, means for delivering fuel to each of said blades, means for igniting said fuel and air within said blades, and means for exhausting the products of combustion from within each of said blades.

2. In an aircraft propeller, a hub, a hollow blade associated therewith, a fuel burner in the shank thereof having a fixed air orifice and fixed fuel jet, a conduit leading outwardly radially of the axis of said hub to said jet and said conduit being constricted by said jet, means for controllably delivering fuel to said conduit to establish a column of liquid therein of a radial length to establish a pressure head at said jet to provide a flow therethrough having a combustible ratio with respect to the flow of air through said air orifice, and means responsive to rotation speed and atmospheric pressure associated with said delivering means to maintain said combustible ratio.

3. A propeller de-icer, comprising a propeller having a hollow blade, a combustion chamber rotatable with said propeller and supplying hot products of combustion to the interior of said blade, a stationary source of fuel for said combustion chamber, a rotating U-shaped ring movable with said propeller, a connection for conducting fuel from said source to said ring, a carburetor for said combustion chamber, a connection between said ring and said carburetor, and means for igniting combustible mixture supplied to said combustion chamber by said carburetor.

4. Apparatus for de-icing a hollow blade propeller, including in combination, a combustion chamber rotatable with said propeller and supplying hot products of combustion to the interior of the blade, means including a stationary fuel jet and an annular inwardly opening ring facing the jet and rotatable with the propeller for supplying fuel to the ring, a carburetor rotatable with the combustion chamber, and a fuel connection between said ring and said carburetor for supplying fuel from said ring to said carburetor.

EVERETT P. PALMATIER.

REFERENCES CITED

The following references are of record in the file of this patent:

UNITED STATES PATENTS

| Number | Name | Date |
|---|---|---|
| 1,099,083 | Duc | June 2, 1914 |
| 2,129,565 | Clay | Sept. 6, 1938 |
| 2,334,175 | Clay | Nov. 16, 1943 |
| 2,335,018 | Morris et al. | Nov. 23, 1943 |

FOREIGN PATENTS

| Number | Country | Date |
|---|---|---|
| 27,087 1910 | Great Britain | Aug. 17, 1911 |
| 227,151 | Great Britain | Jan. 12, 1925 |